(12) United States Patent
Vanderleest et al.

(10) Patent No.: US 8,297,036 B2
(45) Date of Patent: Oct. 30, 2012

(54) METHOD AND APPARATUS FOR DETERMINING FAILURES OF GAS SHUTOFF VALVES IN GAS TURBINES

(75) Inventors: Ruurd A. Vanderleest, Vernon, CT (US); Stuart S. Hay, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 795 days.

(21) Appl. No.: 12/137,492

(22) Filed: Jun. 11, 2008

(65) Prior Publication Data

US 2009/0313966 A1 Dec. 24, 2009

(51) Int. Cl.
*F02C 9/26* (2006.01)

(52) U.S. Cl. ........... 60/39.091; 60/772; 60/773; 60/779; 60/734; 60/39.281

(58) Field of Classification Search ............... 60/39.091, 60/772, 778, 779, 734
See application file for complete search history.

(56) References Cited

U.S. PATENT DOCUMENTS

| | | | |
|---|---|---|---|
| 4,117,668 A | 10/1978 | Elsaesser et al. | |
| 4,722,180 A | 2/1988 | Lindler et al. | |
| 4,768,338 A | 9/1988 | Lindler et al. | |
| 5,465,570 A | 11/1995 | Szillat et al. | |
| 5,581,995 A * | 12/1996 | Lucenko et al. | 60/779 |
| 5,916,126 A | 6/1999 | Szillat et al. | |
| 6,810,676 B2 | 11/2004 | O'Connor | |
| 6,988,368 B2 | 1/2006 | O'Connor | |
| 7,111,463 B2 | 9/2006 | Sprouse et al. | |
| 7,204,090 B2 | 4/2007 | O'Connor | |
| 7,322,197 B2 | 1/2008 | Kudrna et al. | |
| 2005/0268972 A1 * | 12/2005 | Gainford | 137/601.14 |

* cited by examiner

*Primary Examiner* — Ehud Gartenberg
*Assistant Examiner* — Steven Sutherland
(74) *Attorney, Agent, or Firm* — Carlson Gaskey & Olds P.C.

(57) ABSTRACT

A controller for a turbine power plant that is operable to identify a failure condition and measure a shutoff valve performance.

14 Claims, 4 Drawing Sheets

METHOD AND APPARATUS FOR DETERMINING FAILURES OF GAS SHUTOFF VALVES IN GAS TURBINES

BACKGROUND

The present invention relates to a gas turbine engine, and more particularly to a fuel supply thereto.

Shutoff valves (SOVs) for Industrial Gas turbines operate to selectively supply gas fuel to a burner section. During the start sequence, the SOVs are opened and various methods are employed to detect if flame has been established within the burner section. If a flame is not detected, the SOVs are again closed. Failure to achieve flame may be due to several causes such as igniter failure or failure of the SOVs to properly open.

SUMMARY

A turbine power plant according to an exemplary aspect of the present invention includes a fuel system operable to supply a fuel to a gas turbine engine through a fuel supply line. At least one shutoff valve within the fuel supply line and a controller in communication with a pressure sensor and the shutoff valve operable to identify a failure condition.

A method of identifying a failure condition according to an exemplary aspect of the present invention includes measuring a pressure of a burner section of a gas turbine engine to obtain a pressure signal which is filtered to generate a filtered pressure signal. The pressure signal is then related to the filtered pressure signal to identify a failure condition from the relationship of the pressure signal to the filtered pressure signal.

A method of measuring a performance of a shutoff valve according to an exemplary aspect of the present invention includes measuring a pressure of a burner section of a gas turbine engine to obtain a pressure signal which is filtered to generate a filtered pressure signal. The filtered pressure signal is then related to an actuation command to a shutoff valve to measure a performance of the shutoff valve from the relationship of the filtered pressure signal to the actuation command.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1:
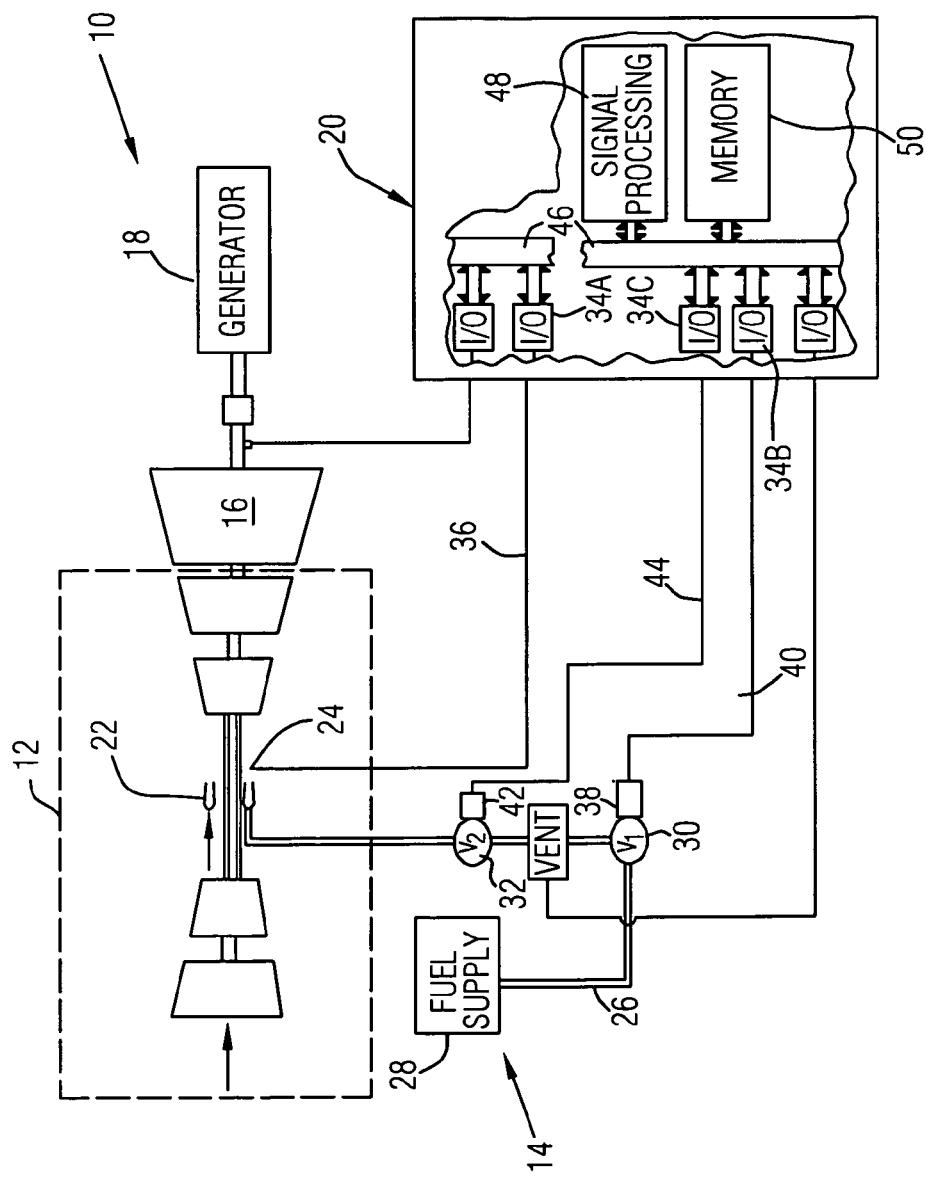
FIG. 1 is a schematic view of a gas turbine power plant of the type in which the present invention may be used.

FIG. 1 schematically illustrates a gas turbine power plant 10. The gas turbine power plant 10 generates electricity and generally includes a gas turbine engine 12, a fuel system 14, a power turbine 16, a generator 18, and an engine control 20. The gas turbine engine 12 includes a burner section 22 having a pressure sensor 24 disposed in close proximity to an outlet or within the burner section 22. In alternate embodiments the gas turbine engine may be a single spool type or multiple spool type and the burner section 22 may have a plurality of combustors.

The fuel system 14 generally includes a fuel supply line 26 between a fuel supply 28, a first shutoff valve (SOV1) 30, a second shutoff valve (SOV2) 32 and the burner section 22. It should be noted that SOVs require 'muscle' pressure and cannot open without the presence of gas pressure.

The pressure sensor 24 communicates with the control 20 to provide a sensed pressure signal indicative of the actual pressure within the burner section 22. The control 20 includes an input/output device 34A connected to receive the sensed pressure signal from the pressure sensor 24 through line 36. A first actuator input/output device 34B is connected to deliver a command signal to an actuator 38 which controls SOV1 30 through line 40. A second actuator input/output device 34C is connected to deliver a command signal to an actuator 42 which controls SOV2 32 through line 44. Each of the input/output devices 34A, 34B, 34C are connected to a data bus 46 which communicates with a processor 48 and a memory 50.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or non-volatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the control 20 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 2A:
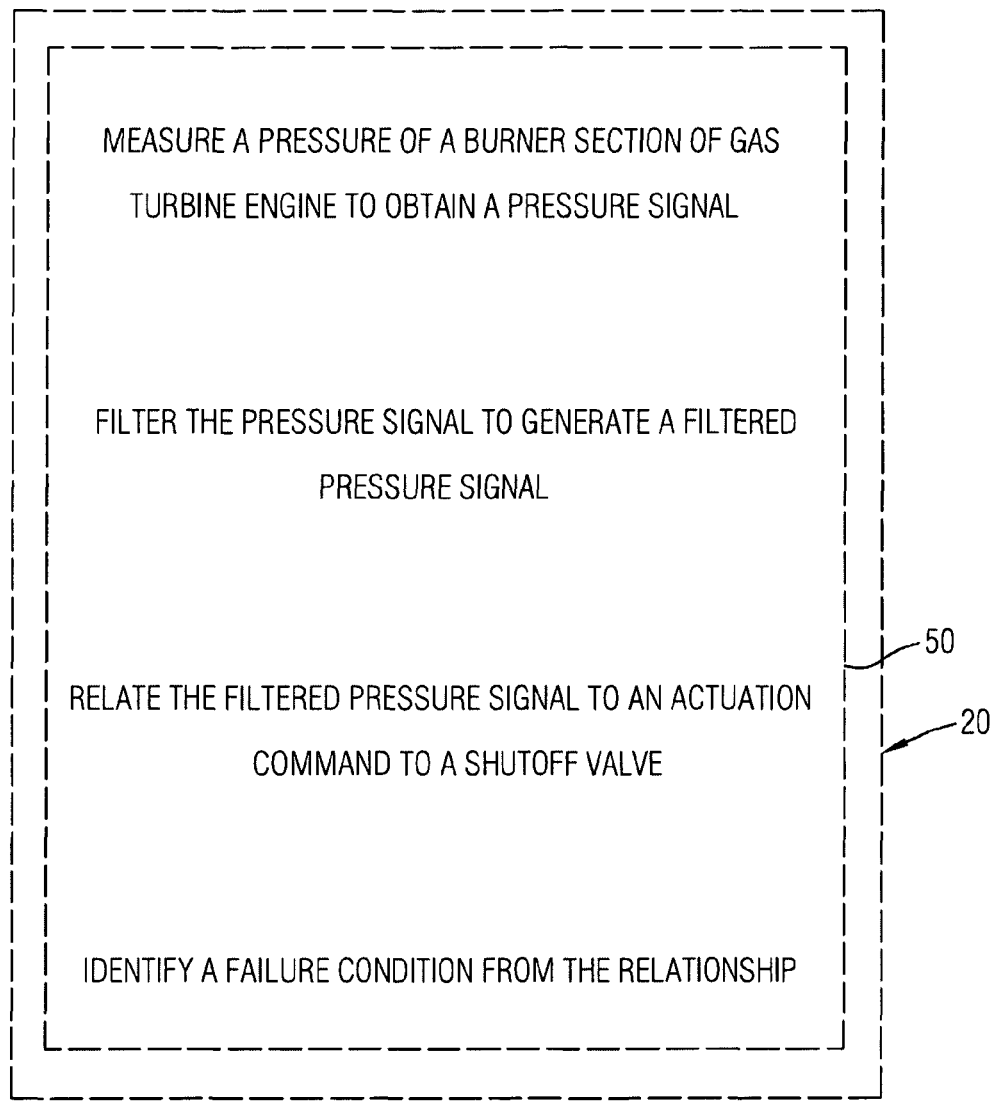
FIG. 2A is a flowchart to identify a failure condition that may not include a shutoff valve failure.

Referring to FIG. 2A, a flowchart illustrates a software algorithm for the control 20 to identify a failure condition that may not include a shutoff valve failure is illustrated in block form. The pressure sensor 24 samples the pressure within the burner section 22 during various times and/or stages of a start of the gas turbine engine 12 such that the control 20 will determine if fuel gas has entered into the burner section 22. The control 20 will then issue an alert that indicates that there has been a failure of ignition that eliminates the gas delivery system as a potential cause.

Figure 2B:
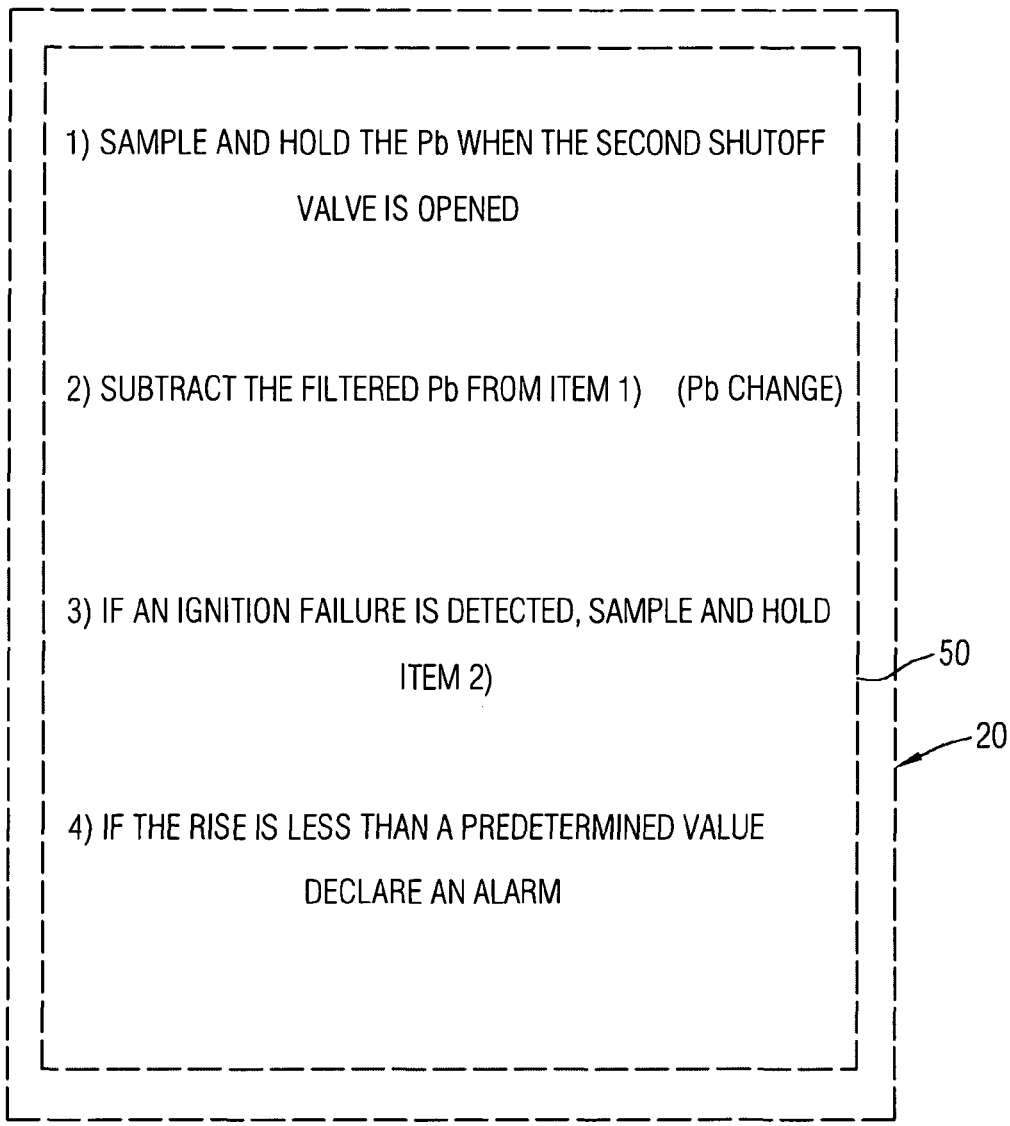
FIG. 2B is a flowchart to identify a failure condition that may not include a shutoff valve failure in accordance with another non-limiting embodiment.

Referring to FIG. 2B, a flowchart illustrates another non-limiting embodiment of another specific software algorithm for the control 20 to identify a failure condition that may not include a shutoff valve failure in block form. Here, the pressure within the burner section 22 is compared to a filtered pressure within the burner section 22 such that if an ignition failure is detected, a rise of less than a predetermined value triggers an alarm.

Figure 3:
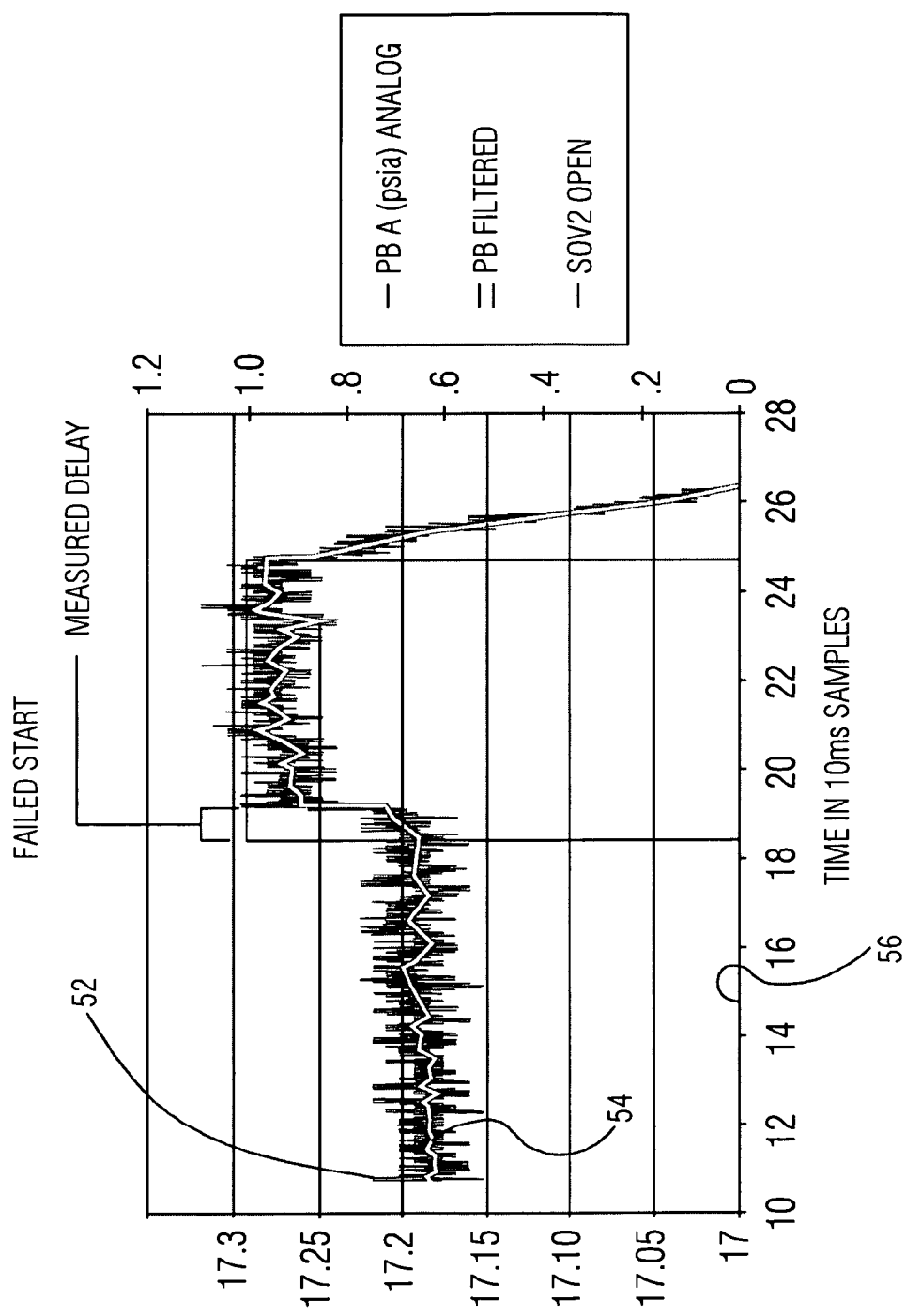
FIG. 3 is a graph illustrating a failed start showing a burner section Pressure, a filtered burner section Pressure and a SOV operation signal.

Referring to FIG. 3, the pressure sensor 24 samples the burner pressure (illustrated as phantom line signal 52) for communication to the control 20. The control 20 is operable to filter the burner pressure (illustrated as phantom line signal 52) to generate a filtered pressure (illustrated as solid line signal 54). The control 20 overlays or otherwise relates the SOV2 command signal (illustrated as dashed line signal 56) to the actuator 42 which controls SOV2 32. Although the command signal (illustrated as dashed line signal 56) to the actuator 42 which controls SOV2 32 is illustrated, it should be understood that the present invention may likewise be utilized with SOV1 30 both individually and/or in combination.

The initial sample by the pressure sensor 24 may be obtained just prior to the SOV1 30 being commanded to open and continue until after SOV2 32 is closed to obtain information that the pressure of the burner section 22 is steady. Other time frames may alternatively or additionally be utilized.

With a two-shutoff valve system, it is highly unlikely that both SOVs will fail. Timing of the SOVs are programmed and known. If filtered burner section 22 pressure is sampled before SOV1 30 is opened, and a rise of burner section 22 pressure increases before SOV2 32 is commanded to open, a SOV2 32 failure can be alarmed if an ignition failure occurs.

Notably, after the SOV2 32 open command at 18.5 ms, the control 20 identifies that the filtered pressure (illustrated as solid line signal 54) increases approximately 0.05 psi. A difference value of 0.05 psi is common for detection of gas flow and thus that SOV2 32 has properly opened. The 0.05 psi difference compared against a known value (approximately 17.15 to 17.20 psi) coupled with a determination that a failure of ignition has occurred may be utilized to identify a failure condition that does not include a SOV2 failure. The failure condition is then utilized to trigger an alert that a failed start has occurred but that SOV2 is properly operational.

The rise in burner pressure is thereby used to detect failure of fuel gas delivery. Various methods can be used to determine the state of the fuel gas supply including feedback switches of shutoff valves and additional pressure sensors in the fuel gas supply line, whereas burner pressure is common instrumentation within the gas turbine engine 12. Using only burner pressure requires sampling during various stages of a start of a gas turbine such that an operator of the gas turbine engine 12 is readily informed of a failure condition such a failure in the fuel system 14.

In another non-limiting embodiment, the filtered pressure (illustrated as solid line signal 54) relative the command signal (illustrated as dashed line signal 56) to the actuator 42 which controls the SOV may be utilized to measure performance of the SOV. That is, the time between SOV activation and burner section 22 pressure increase is measured and stored within memory for comparison such that if the performance of SOV 30,32 is sluggish, this will result in a lengthier time for the burner section 22 pressure to rise after the respective SOV 30,32 is opened.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine power plant comprising:
a gas turbine engine having a burner section;
a fuel system operable to supply a fuel to said gas turbine engine through a fuel supply line;
at least one shutoff valve in fluid communication with said fuel supply line;
a pressure sensor within said burner section; and
a controller in communication with said pressure sensor and said at least one shutoff valve, said controller operable to identify an ignition failure condition, wherein said controller is operable to compare a delay between a signal from said pressure sensor to an actuation command of said at least one shutoff valve, over a period of time, to identify said ignition failure condition.

2. The gas turbine power plant as recited in claim 1, wherein said controller identifies said ignition failure condition based on a comparison of a signal from said pressure sensor to an actuation command of said at least one shutoff valve.

3. The gas turbine power plant as recited in claim 2, wherein said controller compares a signal from said pressure sensor to an actuation command of said at least one shutoff valve.

4. The gas turbine power plant as recited in claim 1, wherein said at least one shutoff valve comprises two shutoff valves.

5. The gas turbine power plant as recited in claim 4, wherein said controller identifies said ignition failure condition when a pressure increase in said burner section is detected before at least one of said two shutoff valves is commanded to open.

6. The gas turbine power plant as recited in claim 4, wherein said controller identifies said ignition failure condition when a pressure increase in said burner section is detected before said two shutoff valves are commanded to open.

7. The gas turbine power plant as recited in claim 6, wherein said controller uses said identification of said ignition failure condition to determine whether a second one of said two shutoff valves is operational.

8. The gas turbine power plant as recited in claim 1, wherein said signal is a pressure signal from said pressure sensor.

9. The gas turbine power plant as recited in claim 1, wherein said signal is a filtered pressure signal from said pressure sensor.

10. A gas turbine power plant comprising:
   a gas turbine engine having a burner section;
   a fuel system operable to supply a fuel to said gas turbine engine through a fuel supply line;
   at least one shutoff valve in fluid communication with said fuel supply line;
   a pressure sensor within said burner section;
   a controller in communication with said pressure sensor and said at least one shutoff valve, said controller operable to identify an ignition failure condition; and
   wherein said controller is operable to compare a delay between a filtered pressure signal from said pressure sensor to an actuation command of said at least one shutoff valve, over a period of time, to measure a performance of said at least one shutoff valve.

11. The gas turbine engine as recited in claim 10, wherein a time between activation of said at least one shutoff valve and a pressure increase in said burner section is measured by the controller.

12. The gas turbine engine as recited in claim 11, wherein said measurement is stored and compared to other time measurements, with the controller, between activation of said at least one shutoff valve and a pressure increase in said burner section.

13. A gas turbine power plant comprising:
   a gas turbine engine having a burner section;
   a fuel system operable to supply a fuel to said gas turbine engine through a fuel supply line;
   at least one shutoff valve in fluid communication with said fuel supply line;
   a pressure sensor within said burner section;
   a controller in communication with said pressure sensor and said at least one shutoff valve, said controller operable to identify an ignition failure condition; and
   wherein said controller is operable to compare a difference between a filtered pressure signal from said pressure sensor to a pressure signal from said pressure sensor to identify said ignition failure condition.

14. The gas turbine power plant as recited in claim 13, wherein said ignition failure condition does not include a failure of said at least one shutoff valve.

* * * * *